3,412,151
DIMETHYLFORMAMIDE PRODUCTION
Kenzie Nozaki, El Cerrito, Calif., assignor to Shell Oil Company, New York, N.Y., a corporation of Delaware
No Drawing. Filed June 17, 1966, Ser. No. 558,249
4 Claims. (Cl. 260—561)

ABSTRACT OF THE DISCLOSURE

Dimethylformamide is produced by carbonylation of trimethylamine in the presence of water and dicobalt octacarbonyl catalyst.

This invention relates to an improved method of producing dimethylformamide.

Prior art

Reference is made in the art to a process of producing dimethylformamide by contacting trimethylamine with carbon monoxide in the presence of a metal-containing catalyst. The German Patent No. 863,800, Jan. 19, 1953, to Krzikalla et al. discloses the contacting of trimethylamine with carbon monoxide in the presence of a supported catalyst comprising mixed oxides of magnesium, thorium and cobalt to produce dimethylformamide. The German Patent No. 948,056, Aug. 30, 1956, to Friederich et al. discloses a similar contacting in the presence of added hydrogen and a catalyst comprising cobalt bromide and a complex of the formula $[(CH_3)_4N]_2CoBr_2I_2$. The products obtained, however, were N-methyldiacetimide and N,N-dimethylacetamide. Dimethylformamide was not observed as a product.

Objects

It is an object of the present invention to provide an improved method for the production of N,N-dimethylformamide, herein termed dimethylformamide. More particularly, it is an object to provide an improved process for the production of dimethylformamide from trimethylamine.

The invention

It has now been found that these objects are accomplished by the process of contacting trimethylamine, carbon monoxide and water, at elevated temperature and pressure, in the presence of dicobalt octacarbonyl as catalyst.

Process conditions

The process of the invention comprises intimately contacting the trimethylamine, carbon monoxide and water, or preliminary reaction products thereof, in the presence of the dicobalt octacarbonyl catalyst. No special precautions are required with regard to the reaction mixture components and commercially available grades of these materials of reasonable purity are satisfactory.

The method of reactant contacting is not critical and is suitably effected by any of several procedures. In one modification, the process is conducted in a continuous manner as by contacting the reactants and catalyst during passage through a tubular reactor. In a second modification, the process is conducted in a batchwise manner in an autoclave or similar pressure reactor. In either modification, satisfactory results are obtained by initially adding the entire amounts of the reactants to the reactor although it is equally useful and on some occasions preferred to add one reaction mixture component to the others in increments, e.g., as by charging the catalyst, trimethylamine and carbon monoxide to the reactor and adding the water to the resulting mixture in increments. In a particularly preferred modification, the trimethylamine is "pretreated" by contact with carbon monoxide at reaction conditions in the presence of the catalyst to produce an initial product mixture, to which the water reactant is then added and reaction is allowed to continue.

The reaction temperature is not critical and temperatures from about 150° C. to about 275° C. are satisfactory with the temperature range from about 175° C. to about 250° C. being preferred. The precise reaction pressure will in part depend upon the reaction temperature employed. In a typical procedure the reactor is pressurized with carbon monoxide at ambient temperature and the reaction mixture is then heated to the desired reaction temperature. The initial carbon monoxide pressure inside the reactor will increase accordingly. Within the suitable temperature range, carbon monoxide pressures from about 1000 p.s.i.g. to about 6000 p.s.i.g. are satisfactory with best results being obtained when a carbon monoxide pressure from about 1500 p.s.i.g. to about 2500 p.s.i.g. at reaction temperature is utilized.

The presence in the reaction mixture of an inert diluent does not appear to provide any detrimental effect and if desired inert normally-liquid diluents such as hydrocarbons free from aliphatic unsaturation, e.g., hexane, heptane, cyclohexane, decane, benzene, toluene, tetrahydronaphthalene and the like, or inert normally-gaseous diluents such as nitrogen, argon, or helium may be utilized. However, no apparent advantage arises through the use of a reaction diluent and in the preferred modification the added reaction mixture components consist essentially of the trimethylamine, carbon monoxide and water reactants and the dicobalt octacarbonyl catalyst. It is preferred that the reaction be conducted in an essentially inert reaction environment and the presence of substantial quantities of reactive materials such as oxygen and hydrogen is preferably avoided.

The water

The water employed as reactant is utilized in molar amounts which are preferably equal to or greater than the trimethylamine reactant. Molar ratios of water to trimethylamine from about 0.5:1 to about 5:1 are satisfactory, but moral ratios from about 1:1 to about 3:1 are preferred.

The catalyst

The dicobalt octacarbonyl is employed in catalytic amounts, i.e., molar amounts that are equal to or less than the amount of trimethylamine. Molar ratios of dicobalt octacarbonyl to trimethylamine from about 1:1000 to 1:2 are satisfactory. Preferred, however, are molar ratios of dicobalt octacarbonyl to trimethylamine from about 1:500 to about 1:10. In some applications, it may be preferable to employ dicobalt octacarbonyl on an inert, neutral support, e.g., silica alumina or the like, but in the preferred modification the dicobalt octacarbonyl is employed as an unsupported catalyst.

Subsequent to reaction, the product mixture is separated and the dimethylformamide is recovered by conventional means, e.g., fractional distillation, selective extraction, fractional crystallization and the like. Any unreacted trimethylamine is suitably recycled to the catalyst which is reusable without regeneration.

The product of the invention, dimethylformamide, is a chemical of commerce having established utility as a solvent, for example, as a solvent for polyacrylonitrile fibers.

To further illustrate the improved process of the invention, the following examples are provided. It should be understood that the details thereof are not to be regarded as limitations, as they may be varied as will be understood by one skilled in this art.

Example I

To an autoclave was charged 2 g. of trimethylamine, 1 g. of water and 0.2 g. of dicobalt octacarbonyl. The reactor was pressurized to 1200 p.s.i.g. of carbon monoxide and the reactor and contents were heated to 225° C. and maintained at that temperature for 16 hours. The initial pressure at reaction temperature was 2000 p.s.i.g. The products were collected by venting the reactor through a trap maintained at −80° C. while the reactor remained at 225° C. and the remaining product was transferred from the reactor to the trap with the aid of a vacuum. The product mixture, 3.2 g., was analyzed by gas-liquid chromatography and found to consist of 27% wt. water, 5% wt. dimethylacetamide, 12% wt. dimethylformamide, 10% wt. acetic acid and 46% wt. unreacted trimethylamine. The conversion of trimethylamine was 27% and the selectivity to dimethylformamide was 59%.

Example II

By the procedure of Example I, a similar run was made except that water was not added. The product mixture consisted of 39% wt. unreacted trimethylamine, 60% wt. dimethylacetamide and 1% wt. dimethylformamide.

Example III

To a reactor was charged 2 g. of trimethylamine and 0.53 g. dicobalt octacarbonyl. The reactor was pressurized with carbon monoxide to 1200 p.s.i.g. and the reactor was heated to 225° C. Over a 30 hour period, 2 g. of water were added in 0.1 g. increments. The product mixture, 4.8 g., was collected according to the procedure of Example I, and was found to consist of 38% wt. water, 12% wt. dimethylacetamide, 18% wt. dimethylformamide, 15% wt. acetic acid and 17% wt. unreacted trimethylamine. The conversion of trimethylamine was 59% and the selectivity to dimethylformamide was 59%.

Example IV

To a reactor was charged 2 g. of trimethylamine and 0.50 g. of dicobalt octacarbonyl. The reactor was pressurized to 1200 p.s.i.g. with carbon monoxide and heated at 225° C. for 16 hours. There was then added 3.35 g. of water and the resulting mixture was heated at 225° C. for an additional 16 hours. The product mixture, 6.9 g., was collected according to the procedure of Example I and was found to consist of 53% wt. water, 8% wt. dimethylacetamide, 20% wt. dimethylformamide, 17% wt. acetic acid and 2% wt. unreacted trimethylamine. The conversion of trimethylamine was 94% and the selectivity to dimethylformamide was 59%.

I claim as my invention:

1. The process of producing dimethylformamide by intimately contacting a reaction mixture consisting essentially of trimethylamine, water and carbon monoxide in the presence of a catalytic amount of dicobalt octacarbonyl catalyst, the molar ratio of water to trimethylamine being from about 0.5:1 to about 5:1 and the molar ratio of dicobalt octacarbonyl to trimethylamine being from about 1:500 to about 1:10, at a temperature from about 150° C. to about 275° C. and a carbon monoxide pressure from about 1000 p.s.i.g. to about 6000 p.s.i.g.

2. The process of claim 1 wherein the pressure is from about 1500 p.s.i.g. to about 2500 p.s.i.g and the temperature is from about 175° C. to about 250° C.

3. The proces sof claim 1 wherein at least a portion of said water is added subsequent to the initial contacting of the trimethylamine and carbon monoxide in the presence of the dicobalt octacarbonyl catalyst.

4. The process of claim 3 wherein essentially all of the water is added subsequent to said initial contacting.

References Cited

FOREIGN PATENTS 628,659  9/1949  Great Britain.

OTHER REFERENCES

Bird, Chemical Reviews (1962), pp. 294–99.

NICHOLAS S. RIZZO, *Primary Examiner.*

J. A. NARCAVAGE, *Assistant Examiner.*